United States Patent
Fan

(10) Patent No.: US 9,704,440 B2
(45) Date of Patent: Jul. 11, 2017

(54) FIELD-SEQUENTIAL COLOR LIQUID CRYSTAL DISPLAY AND DRIVING METHOD THEREOF

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 325 days.

(21) Appl. No.: 14/422,678

(22) PCT Filed: Jan. 6, 2015

(86) PCT No.: PCT/CN2015/070206
§ 371 (c)(1),
(2) Date: Feb. 19, 2015

(87) PCT Pub. No.: WO2016/090719
PCT Pub. Date: Jun. 16, 2016

(65) Prior Publication Data
US 2016/0343307 A1 Nov. 24, 2016

(30) Foreign Application Priority Data
Dec. 10, 2014 (CN) .......................... 2014 1 0758411

(51) Int. Cl.
*G09G 3/34* (2006.01)
*G09G 3/36* (2006.01)
(Continued)

(52) U.S. Cl.
CPC ..... *G09G 3/3413* (2013.01); *G02F 1/133514* (2013.01); *G02F 1/133621* (2013.01);
(Continued)

(58) Field of Classification Search
CPC .............. H01H 13/72; G02F 1/133514; G02F 1/133528; G02F 1/133621; G02F 1/1368;
(Continued)

(56) References Cited

U.S. PATENT DOCUMENTS 9,570,014 B2 * 2/2017 Fan .......................... G09G 3/36
2010/0283801 A1 * 11/2010 Wu ...................... G09G 3/2003
345/690

(Continued)

FOREIGN PATENT DOCUMENTS

CN 104036748 A 9/2014
CN 104112436 A 10/2014

*Primary Examiner* — Dmitriy Bolotin
(74) *Attorney, Agent, or Firm* — Andrew C. Cheng

(57) ABSTRACT

The present invention provides a field sequential color LCD, which includes a LCD panel and a backlight module. The LCD panel includes a color filter of a first color subpixel and a color filter of a second color subpixel, a field sequential cycle of the LCD panel includes a first sub-frame period and a second sub-frame period. The backlight module provides backlight, including red, cyan, blue and green backlights, to the LCD panel. The backlight module provides two of the four backlights in the first sub-fame period, and provides another two of the four backlights in the second sub-frame period. The above LCD can cover the pointer's gamut entirely in the natural world, only color filters of subpixels of two colors are required to achieve tetra-color (RGBC) display, no additional subpixel is required, the manufacturing process of color filter of LCD panel is simplified, and the cost is reduced.

13 Claims, 10 Drawing Sheets

(51) Int. Cl.
*G09G 5/02* (2006.01)
*G02F 1/1335* (2006.01)
*G09G 3/20* (2006.01)
*G02F 1/1368* (2006.01)
*G02F 1/1333* (2006.01)

(52) U.S. Cl.
CPC ............ *G09G 3/2003* (2013.01); *G09G 3/34* (2013.01); *G09G 3/342* (2013.01); *G09G 3/36* (2013.01); *G09G 3/3611* (2013.01); *G09G 5/02* (2013.01); *G02F 1/1368* (2013.01); *G02F 1/133528* (2013.01); *G02F 2001/133302* (2013.01); *G02F 2001/133622* (2013.01); *G02F 2201/40* (2013.01); *G09G 2300/0452* (2013.01); *G09G 2300/0465* (2013.01); *G09G 2310/0235* (2013.01); *G09G 2310/0237* (2013.01); *G09G 2320/064* (2013.01)

(58) Field of Classification Search
CPC ........ G02F 2001/133302; G02F 2001/133622; G02F 2201/40; G09G 2300/0452; G09G 2300/0465; G09G 2310/0235; G09G 2310/0237; G09G 2320/064; G09G 3/2003; G09G 3/34; G09G 3/3413; G09G 3/342; G09G 3/36; G09G 3/3611; G09G 5/02

See application file for complete search history.

(56) References Cited

U.S. PATENT DOCUMENTS

| | | | |
|---|---|---|---|
| 2011/0122176 A1* | 5/2011 | Numao | G09G 3/3607 345/690 |
| 2012/0287168 A1* | 11/2012 | Botzas | G09G 3/3413 345/690 |
| 2014/0002507 A1* | 1/2014 | Ben-Chorin | G09G 3/3413 345/690 |
| 2014/0111561 A1* | 4/2014 | Iyama | G09G 3/3648 345/690 |
| 2015/0168774 A1* | 6/2015 | Hosoki | G09G 3/3413 348/725 |
| 2016/0275878 A1* | 9/2016 | Fan | G09G 3/36 |

* cited by examiner

FIELD-SEQUENTIAL COLOR LIQUID CRYSTAL DISPLAY AND DRIVING METHOD THEREOF

TECHNICAL FIELD

The present invention relates to liquid crystal displays, and more particularly, relates to a field sequential color liquid crystal display and a driving method thereof.

BACKGROUND

With the progress of photoelectric and semiconductor technology, flat panel displays are also developed a lot. In the various flat panel displays, liquid crystal displays (LCDs) become the mainstream product due to excellent characteristics such as high space efficiency, low power consumption, no radiation, and low electromagnetic interference.

A LCD usually includes a LCD panel and a backlight module (BL). Since the LCD panel doesn't emit light itself, and thus the backlight module need to be disposed under the LCD panel for providing surface light required by the LCD panel, and the LCD panel display images using the surface light provided by the backlight module.

With the development of the LCDs technologies, high resolution and high color gamut become the main purposes while developing LCDs. However, in the known LCDs, limited by the color filter and the backlight, even the high gamut LCDs can't cover all the color of natural objects (usually, the color gamut of all object colors is also called pointer's gamut or real surface color). To fully cover all the object colors in LCDs, multiple base colors should be used, and the cyan color is particularly important. However, an additional subpixel should be added into the LCD panel of the LCD to achieve the cyan color, and this will increase process for manufacturing color filters of LCDs, and the cost increase. Besides, compared with the conventional three base color (RGB) subpixel LCD panel having same resolution, such LCD panel having a lower aperture ratio, and also a lower transmittance ratio.

SUMMARY

To solve above problem in the known art, an aspect of the present invention is to provide a field sequential color LCD which includes a LCD panel and a backlight module. The LCD panel includes a color filter of a first color subpixel and a color filter of a second color subpixel. A field sequential cycle of the LCD panel includes a first sub-frame period and a second sub-frame period. The backlight module provides backlight to the LCD panel. The backlight includes red backlight, cyan backlight, blue backlight and green backlight. The backlight module provides the cyan backlight and the red backlight in the first sub-frame period, and provides the blue backlight and the green backlight in the second sub-frame period, or the backlight module provides the cyan backlight and the green backlight in the first sub-frame period, and provides the blue backlight and the red backlight in the second sub-frame period, or the backlight module provides the blue backlight and the green backlight in the first sub-frame period, and provides the cyan backlight and the red backlight in the second sub-frame period, or the backlight module provides the blue backlight and the red backlight in the first sub-frame period, and provides the cyan backlight and the green backlight in the second sub-frame period.

In one embodiment, the field sequential color LCD further includes a field sequential controller. The field sequential controller provides image data corresponding to the cyan backlight and the red backlight to the LCD panel prior to a backlight period of the first sub-frame period, and provides image data corresponding to the blue backlight and the green backlight to the LCD panel prior to a backlight period of the second sub-frame period; or the field sequential controller provides image data corresponding to the cyan backlight and the green backlight to the LCD panel prior to a backlight period of the first sub-frame period, and provides image data corresponding to the blue backlight and the red backlight to the LCD panel prior to a backlight period of the second sub-frame period; or the field sequential controller provides image data corresponding to the blue backlight and the green backlight to the LCD panel prior to a backlight period of the first sub-frame period, and provides image data corresponding to the cyan backlight and the red backlight to the LCD panel prior to a backlight period of the second sub-frame period; or the field sequential controller provides image data corresponding to the blue backlight and the red backlight to the LCD panel prior to a backlight period of the first sub-frame period, and provides image data corresponding to the cyan backlight and the green backlight to the LCD panel prior to a backlight period of the second sub-frame period.

In one embodiment, the field sequential controller provides a pulse width modulating (PWM) signal to the backlight module for controlling a lighten period of a corresponding color backlight provided by the backlight module. The field sequential controller controls a PWM signal corresponding to the cyan backlight and the red backlight is enabled in the backlight period of the first sub-frame period and control a PWM signal corresponding to the blue backlight and the green backlight is disabled in the backlight period of the first sub-frame period, the field sequential controller controls a PWM signal corresponding to the cyan backlight and the red backlight is disabled in a backlight period of the second sub-frame period and control a PWM signal corresponding to the blue backlight and the green backlight is enabled in the backlight period of the second sub-frame period; or the field sequential controller controls a PWM signal corresponding to the cyan backlight and the green backlight is enabled in the backlight period of the first sub-frame period and control a PWM signal corresponding to the blue backlight and the red backlight is disabled in the backlight period of the first sub-frame period, the field sequential controller controls a PWM signal corresponding to the cyan backlight and the green backlight is disabled in a backlight period of the second sub-frame period and control a PWM signal corresponding to the blue backlight and the red backlight is enabled in the backlight period of the second sub-frame period; or the field sequential controller controls a PWM signal corresponding to the blue backlight and the green backlight is enabled in the backlight period of the first sub-frame period and control a PWM signal corresponding to the cyan backlight and the red backlight is disabled in the backlight period of the first sub-frame period, the field sequential controller controls a PWM signal corresponding to the blue backlight and the green backlight is disabled in a backlight period of the second sub-frame period and control a PWM signal corresponding to the cyan backlight and the red backlight is enabled in the backlight period of the second sub-frame period; or the field sequential controller controls a PWM signal corresponding to the blue backlight and the red backlight is enabled in the backlight period of the first sub-frame period and control a PWM signal corresponding to the cyan backlight and the green backlight is disabled in the backlight period of the first sub-frame period, the field sequential controller controls a PWM signal corresponding to the blue backlight and the red backlight is disabled in a backlight period of the second sub-frame period and control a PWM signal corresponding to the cyan backlight and the green backlight is enabled in the backlight period of the second sub-frame period.

In one embodiment, the color filter of the first color subpixel is a color filter of cyan subpixels, the color filter of the second color subpixel is a color filter of yellow subpixels. The backlight module provides the red backlight and the cyan backlight in the backlight period of the first sub-frame period thereby allowing the cyan backlight to pass through the color filter of the first color subpixel and the red backlight to pass through the color filter of the second color subpixel, the backlight module provides the blue backlight and the green backlight in the backlight period of the second sub-frame period thereby allowing the blue backlight to pass through the color filter of the first color subpixel and the green backlight to pass through the color filter of the second color subpixel; or the backlight module provides the cyan backlight and the green backlight in the backlight period of the first sub-frame period thereby allowing the cyan backlight to pass through the color filter of the first color subpixel and the green backlight to pass through the color filter of the second color subpixel, the backlight module provides the blue backlight and the red backlight in the backlight period of the second sub-frame period thereby allowing the blue backlight to pass through the color filter of the first color subpixel and the red backlight to pass through the color filter of the second color subpixel; or the backlight module provides the blue backlight and the green backlight in the backlight period of the first sub-frame period thereby allowing the blue backlight to pass through the color filter of the first color subpixel and the green backlight to pass through the color filter of the second color subpixel, the backlight module provides the red backlight and the cyan backlight in the backlight period of the second sub-frame period thereby allowing the red backlight to pass through the color filter of the first color subpixel and the cyan backlight to pass through the color filter of the second color subpixel; or the backlight module provides the blue backlight and the red backlight in the backlight period of the first sub-frame period thereby allowing the blue backlight to pass through the color filter of the first color subpixel and the red backlight to pass through the color filter of the second color subpixel, the backlight module provides the cyan backlight and the green backlight in the backlight period of the second sub-frame period thereby allowing the cyan backlight to pass through the color filter of the first color subpixel and the green backlight to pass through the color filter of the second color subpixel.

In one embodiment, a right cutoff wavelength of the cyan backlight is less than a left cutoff wavelength of the light passing through the color filter of the second color subpixel, a left cutoff wavelength of the green backlight is greater than a right cutoff wavelength of the light passing through the color filter of the first color subpixel.

Another aspect of the present invention is to provide a driving method of a field sequential color LCD. The field sequential color LCD includes a LCD panel and a backlight module. The LCD panel includes a color filter of a first color subpixel and a color filter of a second color subpixel. A field sequential cycle of the LCD panel includes a first sub-frame period and a second sub-frame period. The backlight module provides backlight to the LCD panel in a backlight period of the first sub-frame period and a backlight period of the second sub-frame period. The backlight includes red backlight, cyan backlight, blue backlight and green backlight. The method includes a step of providing the red backlight and the cyan backlight to the LCD panel in the backlight period of the first sub-frame period, and providing the blue backlight and the green backlight to the LCD panel in the second sub-frame period; or the method includes a step of providing the cyan backlight and the green backlight to the LCD panel in the backlight period of the first sub-frame period, and providing the blue backlight and the red backlight to the LCD panel in the second sub-frame period; or the method includes a step of providing the cyan backlight and the green backlight to the LCD panel in the backlight period of the first sub-frame period, and providing the blue backlight and the red backlight to the LCD panel in the second sub-frame period; or the method includes a step of providing the blue backlight and the red backlight to the LCD panel in the backlight period of the first sub-frame period, and providing the cyan backlight and the green backlight to the LCD panel in the second sub-frame period.

In one embodiment, the field sequential color LCD further includes a field sequential controller. The field sequential controller provides image data corresponding to different colors prior to the backlight period of the first sub-frame period and the prior to the backlight period of the second sub-frame period. The method further includes a step of providing cyan image data and red image data to the LCD panel prior to the backlight period of the first sub-frame period and providing blue image and green image data to the LCD panel prior to the backlight module of the second sub-frame period; or the method further includes a step of providing cyan image data and green image data to the LCD panel prior to the backlight period of the first sub-frame period and providing blue image and red image data to the LCD panel prior to the backlight module of the second sub-frame period; or the method further includes a step of providing blue image data and green image data to the LCD panel prior to the backlight period of the first sub-frame period and providing cyan image and red image data to the LCD panel prior to the backlight module of the second sub-frame period; or the method further includes a step of providing blue image data and red image data to the LCD panel prior to the backlight period of the first sub-frame period and providing cyan image and green image data to the LCD panel prior to the backlight module of the second sub-frame period.

In one embodiment, the field sequential controller provides a pulse width modulating (PWM) signal to the backlight module for controlling a lighten period of a corresponding color backlight provided by the backlight module.

The method further includes a step of controlling a PWM signal corresponding to the cyan backlight and the red backlight is enabled in the backlight period of the first sub-frame period and controlling a PWM signal corresponding to the blue backlight and the green backlight is disabled in the backlight period of the first sub-frame period, controlling a PWM signal corresponding to the cyan backlight and the red backlight is disabled in a backlight period of the second sub-frame period and controlling a PWM signal corresponding to the blue backlight and the green backlight is enabled in the backlight period of the second sub-frame period; or the method further includes a step of controlling a PWM signal corresponding to the cyan backlight and the green backlight is enabled in the backlight period of the first sub-frame period, controlling a PWM signal corresponding to the blue backlight and the red backlight is disabled in the backlight period of the first sub-frame period, controlling a PWM signal corresponding to the cyan backlight and the green backlight is disabled in a backlight period of the second sub-frame period and controlling a PWM signal corresponding to the blue backlight and the red backlight is enabled in the backlight period of the second sub-frame period; or the method further includes a step of controlling a PWM signal corresponding to the blue backlight and the green backlight is enabled in the backlight period of the first sub-frame period, controlling a PWM signal corresponding to the cyan backlight and the red backlight is disabled in the backlight period of the first sub-frame period, controlling a PWM signal corresponding to the blue backlight and the green backlight is disabled in a backlight period of the second sub-frame period and controlling a PWM signal corresponding to the cyan backlight and the red backlight is enabled in the backlight period of the second sub-frame period; or the method further includes a step of controlling a PWM signal corresponding to the blue backlight and the red backlight is enabled in the backlight period of the first sub-frame period, controlling a PWM signal corresponding to the cyan backlight and the green backlight is disabled in the backlight period of the first sub-frame period, controlling a PWM signal corresponding to the blue backlight and the red backlight is disabled in a backlight period of the second sub-frame period and controlling a PWM signal corresponding to the cyan backlight and the green backlight is enabled in the backlight period of the second sub-frame period.

In one embodiment, the color filter of the first color subpixel is a color filter of cyan subpixels, the color filter of the second color subpixel is a color filter of yellow subpixels. The method further includes a step of providing the red backlight and the cyan backlight in the backlight period of the first sub-frame period thereby allowing the cyan backlight to pass through the color filter of the first color subpixel and the red backlight to pass through the color filter of the second color subpixel and providing the blue backlight and the green backlight in the backlight period of the second sub-frame period thereby allowing the blue backlight to pass through the color filter of the first color subpixel and the green backlight to pass through the color filter of the second color subpixel; or the method further includes a step of providing the cyan backlight and the green backlight in the backlight period of the first sub-frame period thereby allowing the cyan backlight to pass through the color filter of the first color subpixel and the green backlight to pass through the color filter of the second color subpixel and providing the blue backlight and the red backlight in the backlight period of the second sub-frame period thereby allowing the blue backlight to pass through the color filter of the first color subpixel and the red backlight to pass through the color filter of the second color subpixel; or the method further includes a step of providing the blue backlight and the green backlight in the backlight period of the first sub-frame period thereby allowing the blue backlight to pass through the color filter of the first color subpixel and the green backlight to pass through the color filter of the second color subpixel, and providing the red backlight and the cyan backlight in the backlight period of the second sub-frame period thereby allowing the red backlight to pass through the color filter of the first color subpixel and the cyan backlight to pass through the color filter of the second color subpixel; or the method further includes a step of providing the blue backlight and the red backlight in the backlight period of the first sub-frame period thereby allowing the blue backlight to pass through the color filter of the first color subpixel and the red backlight to pass through the color filter of the second color subpixel, and providing the cyan backlight and the green backlight in the backlight period of the second sub-frame period thereby allowing the cyan backlight to pass through the color filter of the first color subpixel and the green backlight to pass through the color filter of the second color subpixel.

In one embodiment, a right cutoff wavelength of the cyan backlight is less than a left cutoff wavelength of the light passing through the color filter of the second color subpixel, a left cutoff wavelength of the green backlight is greater than a right cutoff wavelength of the light passing through the color filter of the first color subpixel.

Displayed images of the field sequential color LCD of the present invention can entirely cover all the object color in the natural word, and only color filters of two color subpixels are required to achieve tetra-base color (red, green, blue and cyan) display, no additional subpixels are required, and thus the manufacturing process is simplified and the cost is reduced. In addition, compared with the tri-color (RGB) LCD having the same resolution, the field sequential color LCD of the present invention has greater aperture ratio and transmittance ratio.

BRIEF DESCRIPTION OF THE DRAWINGS

The above and other aspects, and characteristics of embodiments of the present invention will become more clearly according to the description below accompanying with the figures, in which.

DETAILED DESCRIPTION OF PREFERRED EMBODIMENTS

The embodiments of the present invention are described in detail with the reference to the figures. However, the present invention can be carried out in many other manners, and the present invention shouldn't be interpreted as only the described embodiment. In contrast, the provided embodiments are used to explain the principle and spirit of the present invention and the practical application of the present invention, thereby enabling those ordinarily skilled in the art to understand the embodiments of the present invention and make modifications to the embodiments for an specific application. In the figures, a same numeral is used to present a same element throughout the description.

Figure 1:
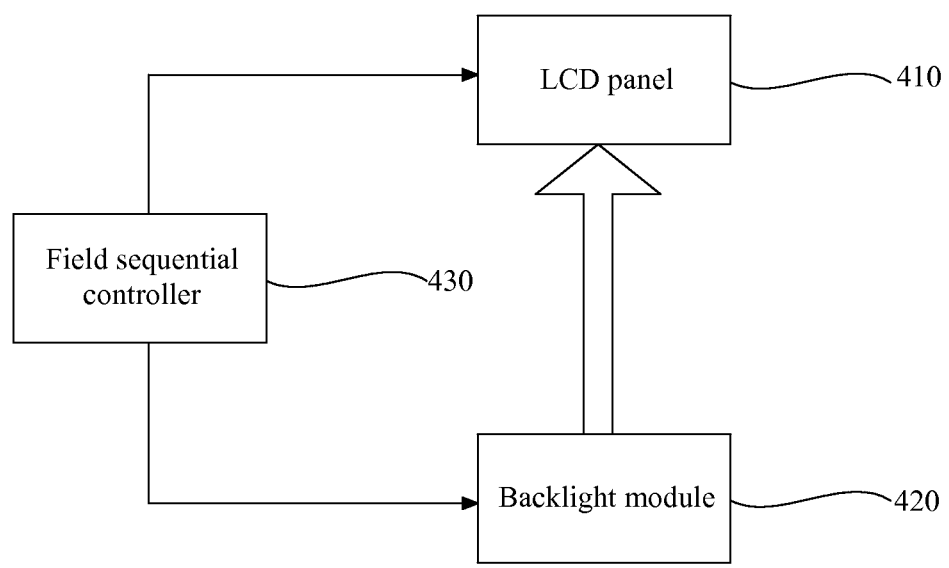
FIG. 1 is a schematic view of a field sequential color LCD in accordance with an embodiment of the present invention.

FIG. 1 is a schematic view of a field sequential color LCD in accordance with an embodiment of the present invention.

Referring to FIG. 1, the field sequential color LCD in accordance with the present embodiment includes a LCD panel 410, a backlight module 420 and a field sequential controller 430.

Figure 2:
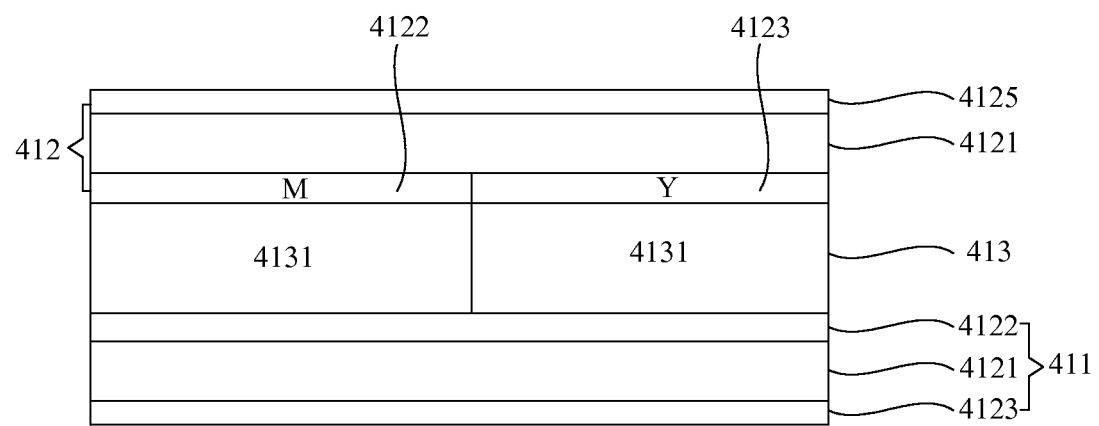
FIG. 2 is a cross sectional schematic view of a LCD panel in accordance with an embodiment of the present invention.

The LCD panel 410 of the present invention will be described in detail as follows. FIG. 2 is a cross sectional schematic view of a LCD panel in accordance with the present embodiment of the present invention.

Referring to FIG. 2, the LCD panel 410 further includes a thin film transistor (TFT) array substrate 411, a color filter substrate 412 and a liquid crystal layer 413 interposed between the two substrates.

Specifically, the TFT array substrate 411 includes a glass substrate 4111, TFT 4112 disposed on the glass substrate 4111 and distributed in an array, and a lower polarizer 4113 disposed under the glass substrate 4111.

The color filter substrate 412, which is disposed opposite to the TFT array substrate 411, includes a transparent substrate 4121, a color filter 4122 of a first color subpixel, a color filter 4123 of a second color subpixel, and a second polarizer 4125 disposed on the transparent substrate 4121. The color filter 4122 and the color filter 4123 are disposed between the transparent substrate 4121 and the liquid crystal layer 413.

The color filter 4122 of the first color subpixel and the color filter 4123 of the second color subpixel consist of a display pixel. In the present embodiment, the color filter may be a thin plastic plate or a glass plate.

The liquid crystal layer 413 includes a number separated sub-pixel areas 4131. Each of the sub-pixel areas 4131 is filled with liquid crystal molecules. The color filter 4122 of the first color subpixel and the color filter 4123 of the second color subpixel corresponds to a subpixel area 4131, respectively.

Figure 3:
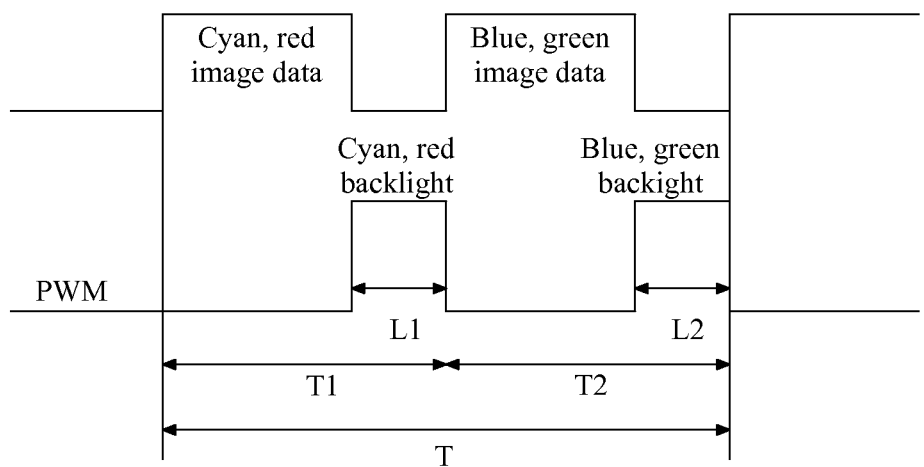
FIG. 3 shows a waveform of a driving signal of a field sequential color LCD in accordance with an embodiment of the present invention.

A driving method (i.e., a display driving method) of a field sequential color LCD will be described in detail as follows. FIG. 3 shows a waveform of a driving signal of a field sequential color LCD in accordance with an embodiment of the present invention.

Referring to FIGS. 1 to 3 together, in the present embodiment, a frame cycle T of the LCD panel 410 is divided into a first sub-frame period and a second sub-frame period sequentially. On the timeline, the original frame ratio is 60 frames per second (fps). That is, the time required by the LCD panel 410 to display an entire color image is about 16.67 ms. Thus, the frame ratio of the field sequential color LCD in accordance with embodiments of the present invention should be increased to 120 fps, then each sub-frame is displayed in 1/120 seconds (equal to 8.33 ms), and two sub-frame consist an entire color image.

In the present embodiment, the backlight module 420 provides backlight to the LCD panel 410. The backlight may include red (R) backlight, cyan (C) backlight, blue (B) backlight and green (G) backlight. To achieve this, the backlight module 420 employee red LEDs to emit red backlight, employee cyan LEDs to emit cyan backlight, employee blue LEDs to emit backlight and employee green LEDs to emit green backlight.

The filed sequential controller 430 open all the optical valves in subpixel areas 4131 corresponding to the color filter of the first color filter 4122 and the color filter of the second color filter 4123 in the first sub-frame period T1 and the second sub-frame period T2. The field sequential controller 430 writes image data of all the colors into the LCD panel prior to providing backlight in the first sub-frame period T1 and prior to providing backlight in the second sub-frame period T2. At the same time, the filed sequential controller 430 controls the backlight module 420 provides backlight of required colors to the LCD panel 410 in the first sub-frame period T1 and the second sub-frame period T2, thereby enabling the LCD panel 410 to display.

In the present embodiment, the color filter 4122 of the first color subpixel is color filter of cyan subpixel, and the color filter 4123 of the second color subpixel is color filter of yellow subpixel.

Thus, the backlight module 420 provides red backlight and cyan backlight in a backlight period L1 in the first sub-frame period, the cyan backlight would easily pass through the color filter 4122 of the first color subpixel, and the red backlight would easily pass through the color filter 4123 of the second color subpixel. Then, the LCD panel 410 display image data corresponding to the red backlight and cyan backlight, in other words, cyan image data and red image data. The backlight module 420 provides blue backlight and green backlight in a backlight period L2 in the second sub-frame period, the blue backlight would easily pass through the color filter 4122 of the first color subpixel, and the green backlight would easily pass through the color filter 4123 of the second color subpixel. Then, the LCD panel 410 display image data corresponding to the blue backlight and green backlight, in other words, blue image data and green image data.

A lighten period of backlight of different colors provided by the backlight module 420 can be controlled by a duty cycle of a pulse width modulating (PWM) signal provided by the field sequential controller 430. Since red backlight can be generated by red LEDs, cyan backlight can be generated by cyan LEDs, blue backlight can be generated by blue LEDs, and green backlight can be generated by green LEDs, and thus in the backlight period L1 of the first sub-frame period T1, a PWM signal for controlling blue LEDs and green LEDs can be disabled, and a PWM signal for controlling red LEDs and cyan LEDs can be enabled; in the backlight period L2 of the second sub-frame period T2, the PWM signal for controlling blue LEDs and green LEDs can be enabled, and the PWM signal for controlling red LEDs and cyan LEDs can be disabled.

Figure 4:
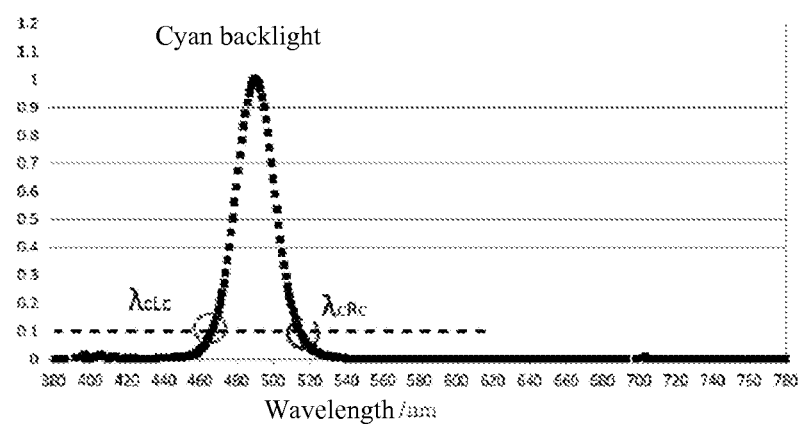
FIG. 4 is a spectrum of the cyan backlight in accordance with an embodiment of the present invention.
Figure 5:
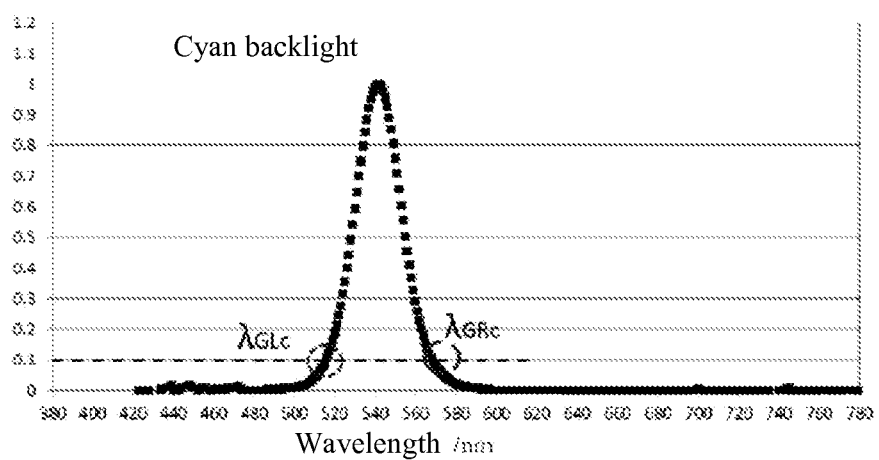
FIG. 5 is a spectrum of the green backlight in accordance with an embodiment of the present invention.
Figure 6:
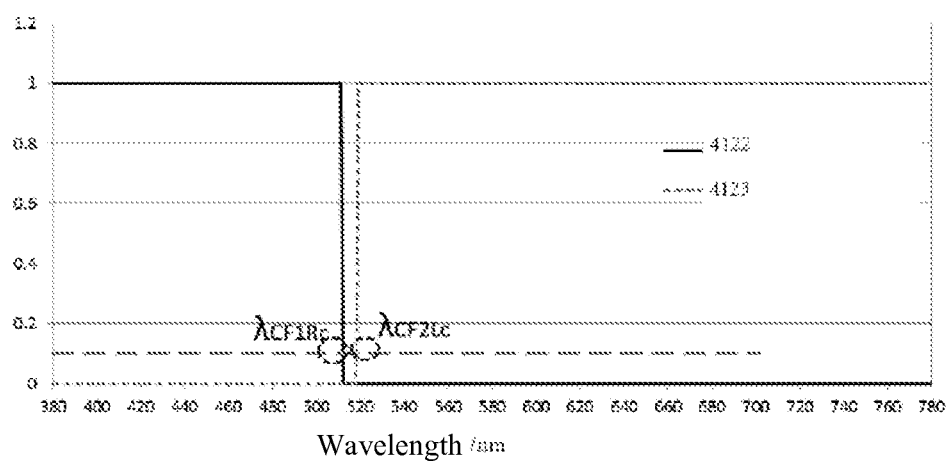
FIG. 6 is a transmittance spectrum of a color filter of a first color subpixel and a color filter of a second subpixel in accordance with an embodiment of the present invention.
Figure 7:
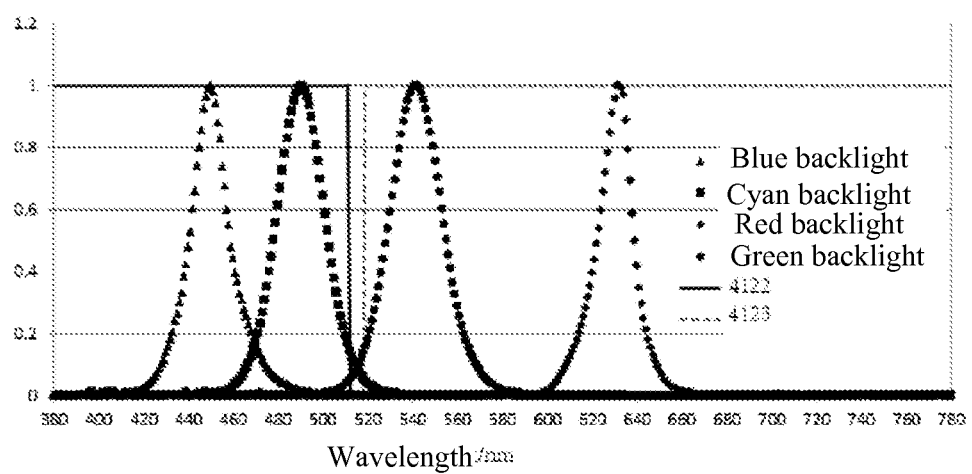
FIG. 7 shows a spectrum of the red backlight, the cyan backlight, the blue backlight and the green backlight, and a transmittance spectrum of a color filter of a first color subpixel and a color filter of a second subpixel in accordance with an embodiment of the present invention.

FIG. 4 is a spectrum of the cyan backlight in accordance with an embodiment of the present invention; FIG. 5 is a spectrum of the green backlight in accordance with an embodiment of the present invention; FIG. 6 is a transmittance spectrum of a color filter of a first color subpixel and a color filter of a second subpixel in accordance with an embodiment of the present invention; FIG. 7 shows a spectrum of the red backlight, the cyan backlight, the blue backlight and the green backlight, and a transmittance spectrum of a color filter of a first color subpixel and a color filter of a second subpixel in accordance with an embodiment of the present invention.

Referring to FIGS. 4 to 6, to obtain pure blue light and cyan light from the color filter 4122 of the first color subpixel that is transparent to short wavelength light and reduce the interference of green light, to obtain pure green light and red light from the color filter 4123 of the second color subpixel that is transparent to long wavelength light and reduce the interference of cyan light, in the present embodiment, a right cutoff wavelength $\lambda_{cRC}$ of cyan backlight is less than a left cutoff wavelength $\lambda_{CF1Rc}$ of the light that can pass through the color filter 4123 of the second color subpixel; and a left cutoff wavelength $\lambda_{GLc}$ of green backlight is greater than a right cutoff wavelength $\kappa_{GF2Lc}$ of the light that can pass through the color filter 4122 of the first color subpixel.

In addition, referring to FIG. 7, according to the field sequential color LCD of the present embodiment, displayed images can cover pointer's gamut entirely, and only color filters of subpixels of two colors are required to achieve tetra-color (RGBC) display, no additional subpixel is required, the manufacturing process of color filter of LCD panel is simplified, and the cost is reduced. Besides, compared with the tri-color (RGB) LCD having the same resolution, the field sequential color LCD of the present invention has greater aperture ratio and transmittance ratio.

Figure 8:
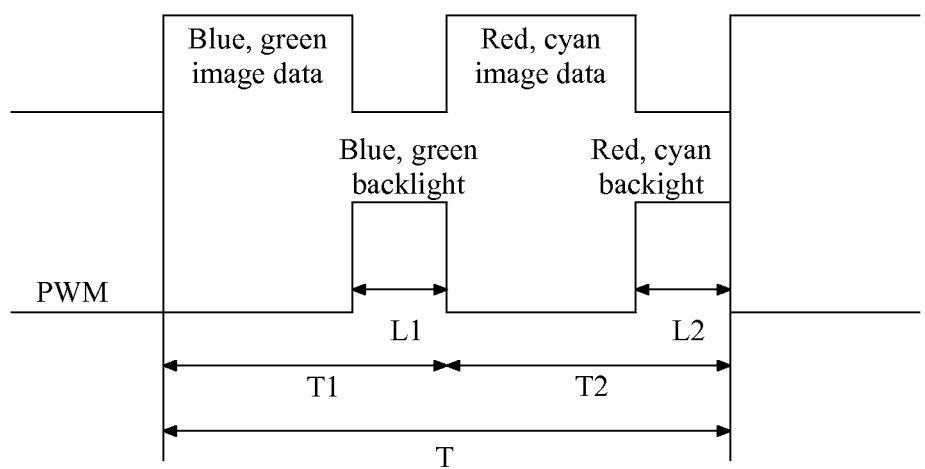
FIG. 8 is a waveform of a driving signal of a field sequential color LCD in accordance with another embodiment of the present invention.

As another embodiment, referring to FIG. 8, the backlight module 420 provides blue backlight and green backlight in a backlight period L1 in the first sub-frame period, the blue backlight would easily pass through the color filter 4122 of the first color subpixel, and the green backlight would easily pass through the color filter 4123 of the second color subpixel. Then, the LCD panel 410 display image data corresponding to the blue backlight and green backlight, in other words, blue image data and green image data. The backlight module 420 provides red backlight and cyan backlight in a backlight period L2 in the second sub-frame period, the red backlight would easily pass through the color filter 4122 of the first color subpixel, and the cyan backlight would easily pass through the color filter 4123 of the second color subpixel. Then, the LCD panel 410 display image data corresponding to the red backlight and cyan backlight, in other words, red image data and cyan image data.

A lighten period of backlight of different colors provided by the backlight module 420 can be controlled by a duty cycle of a pulse width modulating (PWM) signal provided by the field sequential controller 430. Since red backlight can be generated by red LEDs, cyan backlight can be generated by cyan LEDs, blue backlight can be generated by blue LEDs, and green backlight can be generated by green LEDs, and thus in the backlight period L1 of the first sub-frame period T1, a PWM signal for controlling blue LEDs and green LEDs can be enabled, and a PWM signal for controlling red LEDs and cyan LEDs can be disabled; in the backlight period L2 of the second sub-frame period T2, the PWM signal for controlling blue LEDs and green LEDs can be disabled, and the PWM signal for controlling red LEDs and cyan LEDs can be enabled.

Figure 9:
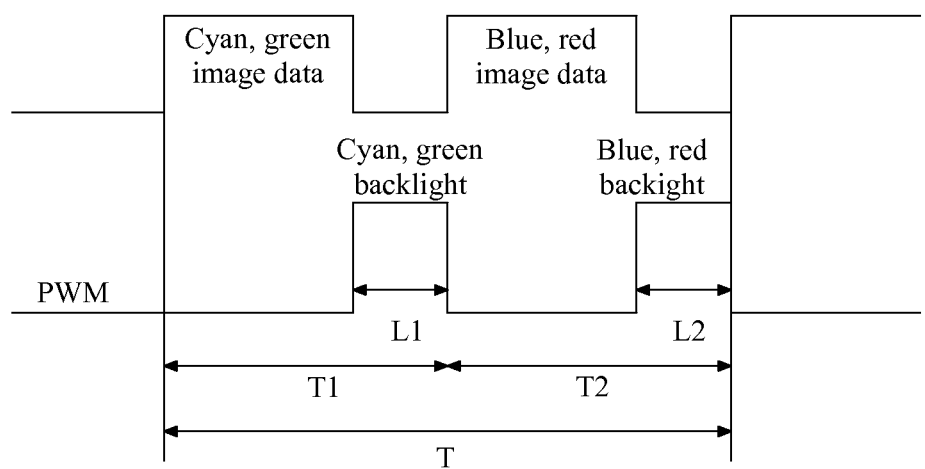
FIG. 9 is a waveform of a driving signal of a field sequential color LCD in accordance with still another embodiment of the present invention.

As another embodiment, referring to FIG. 9, the backlight module 420 provides cyan backlight and green backlight in a backlight period L1 in the first sub-frame period, the cyan backlight would easily pass through the color filter 4122 of the first color subpixel, and the green backlight would easily pass through the color filter 4123 of the second color subpixel. Then, the LCD panel 410 display image data corresponding to the cyan backlight and green backlight, in other words, cyan image data and green image data. The backlight module 420 provides red backlight and blue backlight in a backlight period L2 in the second sub-frame period, the blue backlight would easily pass through the color filter 4122 of the first color subpixel, and the red backlight would easily pass through the color filter 4123 of the second color subpixel. Then, the LCD panel 410 display image data corresponding to the red backlight and blue backlight, in other words, red image data and blue image data.

A lighten period of backlight of different colors provided by the backlight module 420 can be controlled by a duty cycle of a pulse width modulating (PWM) signal provided by the field sequential controller 430. Since red backlight can be generated by red LEDs, cyan backlight can be generated by cyan LEDs, blue backlight can be generated by blue LEDs, and green backlight can be generated by green LEDs, and thus in the backlight period L1 of the first sub-frame period T1, a PWM signal for controlling cyan LEDs and green LEDs can be enabled, and a PWM signal for controlling red LEDs and blue LEDs can be disabled; in the backlight period L2 of the second sub-frame period T2, the PWM signal for controlling cyan LEDs and green LEDs can be disabled, and the PWM signal for controlling red LEDs and blue LEDs can be enabled.

Figure 10:
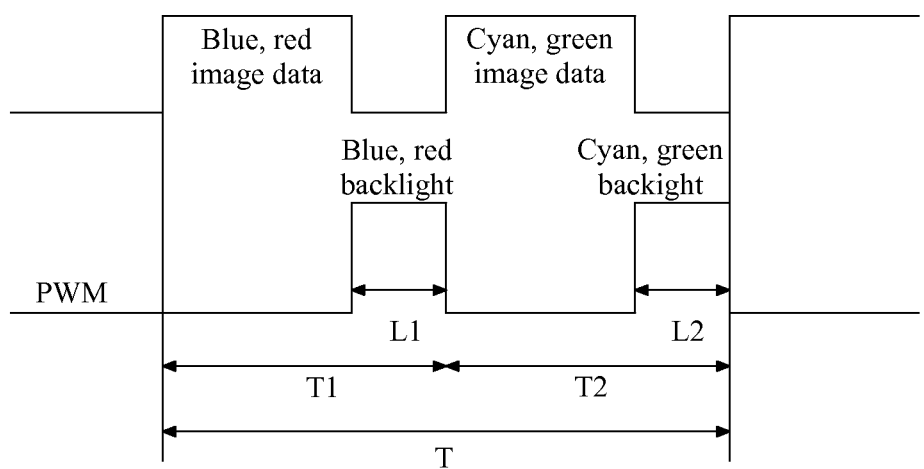
FIG. 10 is a waveform of a driving signal of a field sequential color LCD in accordance with yet another embodiment of the present invention.

As another embodiment, referring to FIG. 10, the backlight module 420 provides red backlight and blue backlight in a backlight period L1 in the first sub-frame period, the blue backlight would easily pass through the color filter 4122 of the first color subpixel, and the red backlight would easily pass through the color filter 4123 of the second color subpixel. Then, the LCD panel 410 display image data corresponding to the blue backlight and red backlight, in other words, blue image data and red image data. The backlight module 420 provides cyan backlight and green backlight in a backlight period L2 in the second sub-frame period, the cyan backlight would easily pass through the color filter 4122 of the first color subpixel, and the green backlight would easily pass through the color filter 4123 of the second color subpixel. Then, the LCD panel 410 display image data corresponding to the cyan backlight and green backlight, in other words, cyan image data and green image data.

A lighten period of backlight of different colors provided by the backlight module 420 can be controlled by a duty cycle of a pulse width modulating (PWM) signal provided by the field sequential controller 430. Since red backlight can be generated by red LEDs, cyan backlight can be generated by cyan LEDs, blue backlight can be generated by blue LEDs, and green backlight can be generated by green LEDs, and thus in the backlight period L1 of the first sub-frame period T1, a PWM signal for controlling green LEDs and cyan LEDs can be disabled, and a PWM signal for controlling blue LEDs and red LEDs can be enabled; in the backlight period L2 of the second sub-frame period T2, the PWM signal for controlling green LEDs and cyan LEDs can be enabled, and the PWM signal for controlling blue LEDs and red LEDs can be disabled.

Although the present invention is described referring to specific embodiments, but it is to be understood by those ordinarily skilled in the art, formal or small changes can be made to the embodiments within the spirit and scope of the present invention as recited in the claims and their equivalents.

What is claimed is:

1. A field sequential color LCD, comprising:
   a LCD panel comprising a color filter of a first color subpixel and a color filter of a second color subpixel, a field sequential cycle of the LCD panel comprising a first sub-frame period and a second sub-frame period;
   a backlight module, configured for providing backlight to the LCD panel, the backlight comprising red backlight, cyan backlight, blue backlight and green backlight;
   a field sequential controller, configured for providing a pulse width modulating (PWM) signal to the backlight module for controlling a lighten period of a corresponding color backlight provided by the backlight module;

the backlight module providing the cyan backlight and the red backlight in the first sub-frame period, and providing the blue backlight and the green backlight in the second sub-frame period; the field sequential controller controlling a PWM signal corresponding to the cyan backlight and the red backlight is enabled in a backlight period of the first sub-frame period and controlling a PWM signal corresponding to the blue backlight and the green backlight is disabled in the backlight period of the first sub-frame period, the field sequential controller controlling a PWM signal corresponding to the cyan backlight and the red backlight is disabled in a backlight period of the second sub-frame period and controlling a PWM signal corresponding to the blue backlight and the green backlight is enabled in the backlight period of the second sub-frame period; or the backlight module providing the cyan backlight and the green backlight in the first sub-frame period, and providing the blue backlight and the red backlight in the second sub-frame period; the field sequential controller controlling a PWM signal corresponding to the cyan backlight and the green backlight is enabled in a backlight period of the first sub-frame period and controlling a PWM signal corresponding to the blue backlight and the red backlight is disabled in the backlight period of the first sub-frame period, the field sequential controller controlling a PWM signal corresponding to the cyan backlight and the green backlight is disabled in a backlight period of the second sub-frame period and controlling a PWM signal corresponding to the blue backlight and the red backlight is enabled in the backlight period of the second sub-frame period; or the backlight module providing the blue backlight and the green backlight in the first sub-frame period, and providing the cyan backlight and the red backlight in the second sub-frame period; the field sequential controller controlling a PWM signal corresponding to the blue backlight and the green backlight is enabled in the backlight period of the first sub-frame period and controlling a PWM signal corresponding to the cyan backlight and the red backlight is disabled in the backlight period of the first sub-frame period, the field sequential controller controlling a PWM signal corresponding to the blue backlight and the green backlight is disabled in a backlight period of the second sub-frame period and controlling a PWM signal corresponding to the cyan backlight and the red backlight is enabled in the backlight period of the second sub-frame period; or the backlight module providing the blue backlight and the red backlight in the first sub-frame period, and providing the cyan backlight and the green backlight in the second sub-frame period; the field sequential controller controlling a PWM signal corresponding to the blue backlight and the red backlight is enabled in a backlight period of the first sub-frame period and controlling a PWM signal corresponding to the cyan backlight and the green backlight is disabled in the backlight period of the first sub-frame period, the field sequential controller controlling a PWM signal corresponding to the blue backlight and the red backlight is disabled in a backlight period of the second sub-frame period and controlling a PWM signal corresponding to the cyan backlight and the green backlight is enabled in the backlight period of the second sub-frame period.

2. The field sequential color LCD of claim 1, wherein
the field sequential controller providing image data corresponding to the cyan backlight and the red backlight to the LCD panel prior to the backlight period of the first sub-frame period, and providing image data corresponding to the blue backlight and the green backlight to the LCD panel prior to the backlight period of the second sub-frame period; or the field sequential controller providing image data corresponding to the cyan backlight and the green backlight to the LCD panel prior to the backlight period of the first sub-frame period, and providing image data corresponding to the blue backlight and the red backlight to the LCD panel prior to the backlight period of the second sub-frame period; or the field sequential controller providing image data corresponding to the blue backlight and the green backlight to the LCD panel prior to the backlight period of the first sub-frame period, and providing image data corresponding to the cyan backlight and the red backlight to the LCD panel prior to the backlight period of the second sub-frame period; or the field sequential controller providing image data corresponding to the blue backlight and the red backlight to the LCD panel prior to the backlight period of the first sub-frame period, and providing image data corresponding to the cyan backlight and the green backlight to the LCD panel prior to the backlight period of the second sub-frame period.

3. The field sequential color LCD of claim 2, wherein the color filter of the first color subpixel is a color filter of cyan subpixels, the color filter of the second color subpixel is a color filter of yellow subpixels;

the backlight module providing the red backlight and the cyan backlight in the backlight period of the first sub-frame period thereby allowing the cyan backlight to pass through the color filter of the first color subpixel and the red backlight to pass through the color filter of the second color subpixel, the backlight module providing the blue backlight and the green backlight in the backlight period of the second sub-frame period thereby allowing the blue backlight to pass through the color filter of the first color subpixel and the green backlight to pass through the color filter of the second color subpixel; or the backlight module providing the cyan backlight and the green backlight in the backlight period of the first sub-frame period thereby allowing the cyan backlight to pass through the color filter of the first color subpixel and the green backlight to pass through the color filter of the second color subpixel, the backlight module providing the blue backlight and the red backlight in the backlight period of the second sub-frame period thereby allowing the blue backlight to pass through the color filter of the first color subpixel and the red backlight to pass through the color filter of the second color subpixel; or the backlight module providing the blue backlight and the green backlight in the backlight period of the first sub-frame period thereby allowing the blue backlight to pass through the color filter of the first color subpixel and the green backlight to pass through the color filter of the second color subpixel, the backlight module providing the red backlight and the cyan backlight in the backlight period of the second sub-frame period thereby allowing the red backlight to pass through the color filter of the first color subpixel and the cyan backlight to pass through the color filter of the second color subpixel; or the backlight module providing the blue backlight and the red backlight in the backlight period of the first sub-frame period thereby allowing the blue backlight to pass through the color filter of the first color subpixel and the red backlight to pass through the color filter of the second color subpixel, the backlight module providing the cyan backlight and the green backlight in the backlight period of the second sub-frame period thereby allowing the cyan backlight to pass through the color filter of the first color subpixel and the green backlight to pass through the color filter of the second color subpixel.

4. The field sequential color LCD of claim 3, wherein a right cutoff wavelength of the cyan backlight is less than a left cutoff wavelength of the light passing through the color filter of the second color subpixel, a left cutoff wavelength of the green backlight is greater than a right cutoff wavelength of the light passing through the color filter of the first color subpixel.

5. The field sequential color LCD of claim 1, wherein the color filter of the first color subpixel is a color filter of cyan subpixels, the color filter of the second color subpixel is a color filter of yellow subpixels;

the backlight module providing the red backlight and the cyan backlight in the backlight period of the first sub-frame period thereby allowing the cyan backlight to pass through the color filter of the first color subpixel and the red backlight to pass through the color filter of the second color subpixel, the backlight module providing the blue backlight and the green backlight in the backlight period of the second sub-frame period thereby allowing the blue backlight to pass through the color filter of the first color subpixel and the green backlight to pass through the color filter of the second color subpixel; or the backlight module providing the cyan backlight and the green backlight in the backlight period of the first sub-frame period thereby allowing the cyan backlight to pass through the color filter of the first color subpixel and the green backlight to pass through the color filter of the second color subpixel, the backlight module providing the blue backlight and the red backlight in the backlight period of the second sub-frame period thereby allowing the blue backlight to pass through the color filter of the first color subpixel and the red backlight to pass through the color filter of the second color subpixel; or the backlight module providing the blue backlight and the green backlight in the backlight period of the first sub-frame period thereby allowing the blue backlight to pass through the color filter of the first color subpixel and the green backlight to pass through the color filter of the second color subpixel, the backlight module providing the red backlight and the cyan backlight in the backlight period of the second sub-frame period thereby allowing the red backlight to pass through the color filter of the first color subpixel and the cyan backlight to pass through the color filter of the second color subpixel; or the backlight module providing the blue backlight and the red backlight in the backlight period of the first sub-frame period thereby allowing the blue backlight to pass through the color filter of the first color subpixel and the red backlight to pass through the color filter of the second color subpixel, the backlight module providing the cyan backlight and the green backlight in the backlight period of the second sub-frame period thereby allowing the cyan backlight to pass through the color filter of the first color subpixel and the green backlight to pass through the color filter of the second color subpixel.

6. The field sequential color LCD of claim 5, wherein a right cutoff wavelength of the cyan backlight is less than a left cutoff wavelength of the light passing through the color filter of the second color subpixel, a left cutoff wavelength of the green backlight is greater than a right cutoff wavelength of the light passing through the color filter of the first color subpixel.

7. A driving method of a field sequential color LCD, the field sequential color LCD comprising a LCD panel, a field sequential controller, and a backlight module;

the LCD panel comprising a color filter of a first color subpixel and a color filter of a second color subpixel, a field sequential cycle of the LCD panel includes a first sub-frame period and a second sub-frame period;

the backlight module providing backlight to the LCD panel in a backlight period of the first sub-frame period and a backlight period of the second sub-frame period, the backlight includes red backlight, cyan backlight, blue backlight and green backlight;

the field sequential controller providing a pulse width modulating (PWM) signal to the backlight module for controlling a lighten period of a corresponding color backlight provided by the backlight module;

the method comprising:

providing the red backlight and the cyan backlight to the LCD panel in the backlight period of the first sub-frame period, controlling a PWM signal corresponding to the cyan backlight and the red backlight is enabled in the backlight period of the first sub-frame period and controlling a PWM signal corresponding to the blue backlight and the green backlight is disabled in the backlight period of the first sub-frame period, and providing the blue backlight and the green backlight to the LCD panel in the second sub-frame period, controlling a PWM signal corresponding to the cyan backlight and the red backlight is disabled in the backlight period of the second sub-frame period and controlling a PWM signal corresponding to the blue backlight and the green backlight is enabled in the backlight period of the second sub-frame period; or the method comprising:

providing the cyan backlight and the green backlight to the LCD panel in the backlight period of the first sub-frame period, controlling a PWM signal corresponding to the cyan backlight and the green backlight is enabled in the backlight period of the first sub-frame period, controlling a PWM signal corresponding to the blue backlight and the red backlight is disabled in the backlight period of the first sub-frame period, and providing the blue backlight and the red backlight to the LCD panel in the second sub-frame period, controlling a PWM signal corresponding to the cyan backlight and the green backlight is disabled in the backlight period of the second sub-frame period and controlling a PWM signal corresponding to the blue backlight and the red backlight is enabled in the backlight period of the second sub-frame period; or the method comprising:

providing the blue backlight and the green backlight to the LCD panel in the backlight period of the first sub-frame period, controlling a PWM signal corresponding to the blue backlight and the green backlight is enabled in the backlight period of the first sub-frame period, controlling a PWM signal corresponding to the cyan backlight and the red backlight is disabled in the backlight period of the first sub-frame period, and providing the cyan backlight and the red backlight to the LCD panel in the second sub-frame period, controlling a PWM signal corresponding to the blue backlight and the green backlight is disabled in a backlight period of the second sub-frame period and controlling a PWM signal corresponding to the cyan backlight and the red backlight is enabled in the backlight period of the second sub-frame period; or the method comprising:

providing the blue backlight and the red backlight to the LCD panel in the backlight period of the first sub-frame period, controlling a PWM signal corresponding to the blue backlight and the red backlight is enabled in the backlight period of the first sub-frame period, controlling a PWM signal corresponding to the cyan backlight and the green backlight is disabled in the backlight period of the first sub-frame period, and providing the cyan backlight and the green backlight to the LCD panel in the second sub-frame period, controlling a PWM signal corresponding to the blue backlight and the red backlight is disabled in a backlight period of the second sub-frame period and controlling a PWM signal corresponding to the cyan backlight and the green backlight is enabled in the backlight period of the second sub-frame period.

8. The driving method of claim 7, wherein the field sequential controller providing image data corresponding to different colors prior to the backlight period of the first sub-frame period and prior to the backlight period of the second sub-frame period;

the method further comprising:

providing cyan image data and red image data to the LCD panel prior to the backlight period of the first sub-frame period and providing blue image and green image data to the LCD panel prior to the backlight module of the second sub-frame period; or the method further comprising:

providing cyan image data and green image data to the LCD panel prior to the backlight period of the first sub-frame period and providing blue image and red image data to the LCD panel prior to the backlight module of the second sub-frame period; or the method further comprising:

providing blue image data and green image data to the LCD panel prior to the backlight period of the first sub-frame period and providing cyan image and red image data to the LCD panel prior to the backlight module of the second sub-frame period; or the method further comprising:

providing blue image data and red image data to the LCD panel prior to the backlight period of the first sub-frame period and providing cyan image and green image data to the LCD panel prior to the backlight module of the second sub-frame period.

9. The driving method of claim 8, wherein the color filter of the first color subpixel is a color filter of cyan subpixels, and the color filter of the second color subpixel is a color filter of yellow subpixels the method further comprising:

providing the red backlight and the cyan backlight in the backlight period of the first sub-frame period thereby allowing the cyan backlight to pass through the color filter of the first color subpixel and the red backlight to pass through the color filter of the second color subpixel; and providing the blue backlight and the green backlight in the backlight period of the second sub-frame period thereby allowing the blue backlight to pass through the color filter of the first color subpixel and the green backlight to pass through the color filter of the second color subpixel; or the method further comprising:

providing the cyan backlight and the green backlight in the backlight period of the first sub-frame period thereby allowing the cyan backlight to pass through the color filter of the first color subpixel and the green backlight to pass through the color filter of the second color subpixel; and providing the blue backlight and the red backlight in the backlight period of the second sub-frame period thereby allowing the blue backlight to pass through the color filter of the first color subpixel and the red backlight to pass through the color filter of the second color subpixel; or the method further comprising:

providing the blue backlight and the green backlight in the backlight period of the first sub-frame period thereby allowing the blue backlight to pass through the color filter of the first color subpixel and the green backlight to pass through the color filter of the second color subpixel; and providing the red backlight and the cyan backlight in the backlight period of the second sub-frame period thereby allowing the red backlight to pass through the color filter of the first color subpixel and the cyan backlight to pass through the color filter of the second color subpixel; or the method further comprising:

providing the blue backlight and the red backlight in the backlight period of the first sub-frame period thereby allowing the blue backlight to pass through the color filter of the first color subpixel and the red backlight to pass through the color filter of the second color subpixel; and providing the cyan backlight and the green backlight in the backlight period of the second sub-frame period thereby allowing the cyan backlight to pass through the color filter of the first color subpixel and the green backlight to pass through the color filter of the second color subpixel.

10. The driving method of claim 9 wherein a right cutoff wavelength of the cyan backlight is less than a left cutoff wavelength of the light passing through the color filter of the second color subpixel, and a left cutoff wavelength of the green backlight is greater than a right cutoff wavelength of the light passing through the color filter of the first color subpixel.

11. The driving method of claim 7, wherein the color filter of the first color subpixel is a color filter of cyan subpixels, and the color filter of the second color subpixel is a color filter of yellow subpixels the method further comprising:
providing the red backlight and the cyan backlight in the backlight period of the first sub-frame period thereby allowing the cyan backlight to pass through the color filter of the first color subpixel and the red backlight to pass through the color filter of the second color subpixel; and
providing the blue backlight and the green backlight in the backlight period of the second sub-frame period thereby allowing the blue backlight to pass through the color filter of the first color subpixel and the green backlight to pass through the color filter of the second color subpixel; or the method further comprising:
providing the cyan backlight and the green backlight in the backlight period of the first sub-frame period thereby allowing the cyan backlight to pass through the color filter of the first color subpixel and the green backlight to pass through the color filter of the second color subpixel; and
providing the blue backlight and the red backlight in the backlight period of the second sub-frame period thereby allowing the blue backlight to pass through the color filter of the first color subpixel and the red backlight to pass through the color filter of the second color subpixel; or the method further comprising:
providing the blue backlight and the green backlight in the backlight period of the first sub-frame period thereby allowing the blue backlight to pass through the color filter of the first color subpixel and the green backlight to pass through the color filter of the second color subpixel; and
providing the red backlight and the cyan backlight in the backlight period of the second sub-frame period thereby allowing the red backlight to pass through the color filter of the first color subpixel and the cyan backlight to pass through the color filter of the second color subpixel; or the method further comprising:
providing the blue backlight and the red backlight in the backlight period of the first sub-frame period thereby allowing the blue backlight to pass through the color filter of the first color subpixel and the red backlight to pass through the color filter of the second color subpixel; and
providing the cyan backlight and the green backlight in the backlight period of the second sub-frame period thereby allowing the cyan backlight to pass through the color filter of the first color subpixel and the green backlight to pass through the color filter of the second color subpixel.

12. The driving method of claim 11, wherein a right cutoff wavelength of the cyan backlight is less than a left cutoff wavelength of the light passing through the color filter of the second color subpixel, and a left cutoff wavelength of the green backlight is greater than a right cutoff wavelength of the light passing through the color filter of the first color subpixel.

13. A field sequential color LCD, comprising:
a LCD panel comprising a color filter of a first color subpixel and a color filter of a second color subpixel, a field sequential cycle of the LCD panel comprising a first sub-frame period and a second sub-frame period;
a backlight module, configured for providing backlight to the LCD panel, the backlight comprising red backlight, cyan backlight, blue backlight and green backlight;
wherein the color filter of the first color subpixel is a color filter of cyan subpixels, the color filter of the second color subpixel is a color filter of yellow subpixels;
the backlight module providing the red backlight and the cyan backlight in a backlight period of the first sub-frame period thereby allowing the cyan backlight to pass through the color filter of the first color subpixel and the red backlight to pass through the color filter of the second color subpixel, the backlight module providing the blue backlight and the green backlight in a backlight period of the second sub-frame period thereby allowing the blue backlight to pass through the color filter of the first color subpixel and the green backlight to pass through the color filter of the second color subpixel; or
the backlight module providing the cyan backlight and the green backlight in a backlight period of the first sub-frame period thereby allowing the cyan backlight to pass through the color filter of the first color subpixel and the green backlight to pass through the color filter of the second color subpixel, the backlight module providing the blue backlight and the red backlight in a backlight period of the second sub-frame period thereby allowing the blue backlight to pass through the color filter of the first color subpixel and the red backlight to pass through the color filter of the second color subpixel; or
the backlight module providing the blue backlight and the green backlight in a backlight period of the first sub-frame period thereby allowing the blue backlight to pass through the color filter of the first color subpixel and the green backlight to pass through the color filter of the second color subpixel, the backlight module providing the red backlight and the cyan backlight in a backlight period of the second sub-frame period thereby allowing the red backlight to pass through the color filter of the first color subpixel and the cyan backlight to pass through the color filter of the second color subpixel; or
the backlight module providing the blue backlight and the red backlight in a backlight period of the first sub-frame period thereby allowing the blue backlight to pass through the color filter of the first color subpixel and the red backlight to pass through the color filter of the second color subpixel, the backlight module providing the cyan backlight and the green backlight in a backlight period of the second sub-frame period thereby allowing the cyan backlight to pass through the color filter of the first color subpixel and the green backlight to pass through the color filter of the second color subpixel;
wherein a right cutoff wavelength of the cyan backlight is less than a left cutoff wavelength of the light passing through the color filter of the second color subpixel, a left cutoff wavelength of the green backlight is greater than a right cutoff wavelength of the light passing through the color filter of the first color subpixel.

\* \* \* \* \*